(12) United States Patent
Yamamoto

(10) Patent No.: US 11,209,404 B2
(45) Date of Patent: Dec. 28, 2021

(54) BIOLOGICAL SAMPLE ANALYZING SYSTEM

(71) Applicant: SHIMADZU CORPORATION, Kyoto (JP)

(72) Inventor: Kohei Yamamoto, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 28 days.

(21) Appl. No.: 16/769,001

(22) PCT Filed: Dec. 5, 2017

(86) PCT No.: PCT/JP2017/043590
§ 371 (c)(1),
(2) Date: Jun. 2, 2020

(87) PCT Pub. No.: WO2019/111312
PCT Pub. Date: Jun. 13, 2019

(65) Prior Publication Data
US 2021/0156831 A1    May 27, 2021

(51) Int. Cl.
*G01N 30/72* (2006.01)
*G01N 27/62* (2021.01)
*G01N 30/86* (2006.01)

(52) U.S. Cl.
CPC .............. *G01N 30/72* (2013.01); *G01N 27/62* (2013.01); *G01N 30/8651* (2013.01)

(58) Field of Classification Search
CPC .... G01N 30/72; G01N 27/62; G01N 30/8651; G01N 35/00

(Continued)

(56) References Cited

U.S. PATENT DOCUMENTS

| 2017/0052171 A1 | 2/2017 | Suzuki et al. |
| 2019/0086374 A1* | 3/2019 | Ito .................... G01N 30/8637 |
| 2019/0119650 A1 | 4/2019 | Suzuki et al. |

FOREIGN PATENT DOCUMENTS

| CN | 106460028 A | 2/2017 |
| EP | 3 138 922 A1 | 3/2017 |

(Continued)

OTHER PUBLICATIONS

"LC/MS/MS Mesoddo Pakkeeji Saibou Baiyou Purofairingu (LC/MS/MS Method Package for Cell Culture Profiling)", [online], [accessed on Nov. 21, 2017], Shimadzu Corporation.

(Continued)

*Primary Examiner* — Nicole M Ippolito
(74) *Attorney, Agent, or Firm* — Sughrue Mion, PLLC

(57) ABSTRACT

A data storage section stores LC/MS analysis data for a large number of culture-medium samples acquired with an LC-MS. Based on those data, a quantitative analyzer calculates concentration values of a large number of compounds in each sample and stores the result in an analysis result storage section. A result display processor retrieves analysis results with the same culture name and different sampling date from the analysis result storage section, creates a table in which concentration values are arranged for each compound and for each sampling date, as well as a graph showing a temporal change in the concentration value of one compound, and displays the table and graph on the same window on a display unit. An operator using an operation unit selects a compound on the displayed table. The result display processor creates a graph for the selected compound and renews the graph on the display.

10 Claims, 12 Drawing Sheets

(58) Field of Classification Search
USPC .............................. 250/281, 282, 283, 288
See application file for complete search history.

(56) References Cited

FOREIGN PATENT DOCUMENTS

| | | |
|---|---|---|
| JP | 2010-128856 A | 6/2010 |
| JP | 2017-170079 A | 9/2017 |
| KR | 10-2016-0143804 A | 12/2016 |
| WO | 2015/166845 A1 | 11/2015 |
| WO | 2017/068727 A1 | 4/2017 |
| WO | 2017/068801 A1 | 4/2017 |

OTHER PUBLICATIONS

"SCLAM-2000, Zenjidou LCMS Maeshori Souchi (SCLAM-2000, Fully Automated Pretreatment System forLC/MS)", [online], [accessed on Nov. 21, 2017], Shimadzu Corporation.
International Search Report for PCT/JP2017/043590 dated Feb. 20, 2018 [PCT/ISA/210].
Written Opinion for PCT/JP2017/043590 dated Feb. 20, 2018 [PCT/ISA/237].

* cited by examiner

Fig. 4

| General | Comment | Sample Info | Security |

| Custom | Details | Previous Version |

Name: [                ▼]    [ Add ]

Type:  [ Text           ▼]   [ Delete ]      ⎯410

Value: [                ]

Properties:
| Name | Value |
| C2MAP_CultureStartingDate... | 2017-05-01 13:00... |
| C2MAP_MediumSamplingD... | 2017-05-02 13:00... |
| C2MAP_CulturePlateNumber | 1 |
| C2MAP_CultureName | Ecto |
| C2MAP_QC | 0 |

⎯411

[ OK ]   [ Cancel ]   [ Apply ]

BIOLOGICAL SAMPLE ANALYZING SYSTEM

CROSS REFERENCE TO RELATED APPLICATIONS

This application is a National Stage of International Application No. PCT/JP2017/043590 filed Dec. 5, 2017.

TECHNICAL FIELD

The present invention relates to an analyzing system configured to determine a quantitative value for each compound by performing a predetermined analysis on a sample containing a plurality of compounds, and to display the quantitative values as an analysis result. More specifically, it relates to a biological sample analyzing system used for performing an analysis on a plurality of samples originating from the same living organism and collected at different points in time. A sample originating from a living organism in the present context includes culture supernatants containing metabolites obtained from culture media on which biological tissue samples (e.g. pluripotent stem cells), microorganisms or the like are cultured.

BACKGROUND ART

In recent years, iPS cells, ES cells and other pluripotent stem cells have been popularly used for research and technical development in the regenerative medicine area. In this type of research and technical development, it is necessary to culture an enormous number of undifferentiated cells which maintain their pluripotency. This requires selecting an appropriate culture environment and controlling the environment in a stable manner. It is also necessary to frequently check the state of the cells being cultured.

For example, consider the situation in which one or more cells in a colony have deviated from the undifferentiated state. Since all cells in the colony have the ability to differentiate, all cells in the colony will ultimately transition to the state of deviation from the undifferentiated state. To avoid this situation, operators must perform day-to-day checking of the state of differentiation of the cells being cultured, to determine whether or not there is a cell that has deviated from the undifferentiated state (i.e. a cell that has already been differentiated or is about to become differentiated).

For the evaluation of the state of differentiation of a cell, a method which uses immunostaining and a method which quantitatively determines the expression level of a marker gene have been commonly used. However, any of those methods requires an invasive treatment on the cell. Therefore, a cell whose state of differentiation has been evaluated can no longer be used for other purposes; for example, the cell cannot be used as a cell source for regenerative medicine. It has also been impossible to evaluate a change of a sample with the passage of time with its identity intact.

In view of this problem, Patent Literature 1, 2 or 3 discloses a method in which the state of differentiation of cells is evaluated based on the result of an analysis in which the abundance of a specific compound in the culture supernatant of a culture medium on which the cells are cultured is analyzed, in place of the cells themselves, using a liquid chromatograph mass spectrometer (LC-MS), gas chromatograph mass spectrometer (GC-MS) or similar device. A software product for an LC-MS for performing a simultaneous multicomponent analysis on a sample collected from a culture medium on which cells are cultured has also been practically used in order to carry out the aforementioned methods (see Non Patent Literature 1). Those methods have a significant advantage in that the state of differentiation of the cells can be evaluated in a non-invasive manner on the cells.

In the previously described case of evaluating the state of differentiation of cells based on the result of an analysis of a specific compound in a culture supernatant, after the test cells have been cultured on a medium, a sample originating from the culture medium used for the culturing (which is hereinafter called the "culture-medium sample") is introduced from the culture device into an analyzing device, such as an LC-MS. The culture-medium sample additionally contains proteins or similar compounds which are unnecessary for the evaluation of the state of differentiation of the cells and may possibly denature the target compound during the passage of time. Therefore, in normal cases, the culture-medium sample is initially introduced into a pretreatment device for the removal of proteins or other treatments before being introduced into the LC-MS. That is to say, the culture-medium sample is introduced from the culture device into the analyzing device, such as the LC-MS, via the pretreatment device. As the pretreatment device, a device capable of automatically and sequentially processing a considerable number of samples held in sample containers is useful. For example, this type of device is disclosed in Patent Literature 4 or Non Patent Literature 2.

CITATION LIST

Patent Literature

Patent Literature 1: WO 2015/166845 A
Patent Literature 2: WO 2017/068727 A
Patent Literature 3: WO 2017/068801 A

Non Patent Literature

Non Patent Literature 1: "LC/MS/MS Mesoddo Pakkeeji Saibou Baiyou Purofairingu (LC/MS/MS Method Package for Cell Culture Profiling)", [online], [accessed on Nov. 21, 2017], Shimadzu Corporation, the Internet
Non Patent Literature 2: "SCLAM-2000, Zenjidou LCMS Maeshori Souchi (SCLAM-2000, Fully Automated Pretreatment System for LC/MS)", [online], [accessed on Nov. 21, 2017], Shimadzu Corporation, the Internet

SUMMARY OF INVENTION

Technical Problem

The culture supernatant of a culture medium on which test cells, microorganisms or the like are cultured contains various compounds, such as a carbon source (e.g. glucose), nitrogen source (e.g. glutamine), essential amino acids, vitamins and other compounds originally contained in the culture medium, as well as various metabolites secreted from the cells or microorganisms. Under normal conditions, the amounts of carbon source, nitrogen source and the like decrease due to consumption with an increase in the number of culture days (culture time), while the amounts of some metabolites secreted from the cells or microorganisms increase. Accordingly, in a simultaneous multicomponent analysis of a culture-medium sample, it is important to not only observe the temporal change in the concentration of each compound but also compare the temporal change in concentration between the compounds. It is also necessary to compare analysis results obtained for samples derived from the same kind of cells cultured under different environments or conditions, or analysis results obtained for samples derived from different kinds of cells cultured under the same environment or condition.

When evaluating a temporal change in the concentration of each compound in the previously described manner in a conventional analyzing system including the previously described type of pretreatment device connected to an LC-MS or similar analyzing device, an operator needs to perform cumbersome tasks, such as the search for analysis results obtained for a plurality of samples obtained from the same culture container with different dates and times of the sampling, as well as the creation of a graph.

In this type of quantitative analysis of compounds related to a living organism, in order to reduce the influence of the biological heterogeneity during the culture time, it is normal to calculate an average or standard deviation of the quantitative values of a plurality of samples containing the same kind of cells cultured under the same condition. For the detection of an occurrence of an abnormality in the culture environment, it is necessary to closely check individual quantitative values. Since the aforementioned graph which shows the temporal change in the concentration of a compound does not allow for the checking of the detailed values of those quantitative values, the operator needs to perform another task to check necessary items of information in addition to the creation of the graph.

The present invention has been developed to solve the previously described problem. Its objective is to provide a biological sample analyzing system which allows an operator to easily perform the checking of a result from a broad perspective, such as the previously described task of grasping or comparing the tendency of the temporal change in quantitative value, as well as the closer checking of the individual quantitative values (or the like).

Solution to Problem

The present invention developed for solving the previously described problem is a biological sample analyzing system configured to analyze a sample originating from a biological tissue or microorganism culture medium, including:

a) an analyzing device configured to perform a predetermined analysis on a sample and acquire signal-intensity-value data reflecting the contents or concentrations of a plurality of compounds contained in the sample;

b) a quantitative analyzer configured to calculate a quantitative value for each compound based on the signal-intensity-value data acquired with the analyzing device;

c) an analysis result storage section configured to store, as an analysis result, the quantitative value of each compound calculated by the quantitative analyzer, along with sample information related to the analyzed sample or in association with the sample information;

d) a table creator configured to use the sample information to retrieve, from the analysis result storage section, analysis results for a plurality of samples originating from a biological tissue or microorganism culture medium and differing from each other in time of sampling, and to create a table in which quantitative values are arranged for each of the plurality of compounds as well as for each time of sampling;

e) a graph creator configured to create a graph showing a temporal change of the quantitative values differing from each other in time of sampling for one or more compounds among the plurality of compounds; and f) a display processor configured to display, on the same screen of a display section, the table created by the table creator and the graph created by the graph creator.

The sample in the present invention is typically a culture supernatant of a culture medium on which cells or microorganisms are cultured. In that case, the plurality of samples differing from each other in time of sampling are a plurality of samples differing from each other in the culture day or culture time, which is the number of days or length of time that has passed since the point in time of the beginning of the culturing (seeding).

There is no specific limitation on the analytical technique in the analyzing device in the present invention. For example, the analyzing device may be a liquid chromatograph (LC), gas chromatograph (GC), liquid chromatograph mass spectrometer (LC-MS), or gas chromatograph mass spectrometer (GC-MS).

In the present invention, for example, if the analyzing device is an LC-MS or GC-MS, the analyzing device performs an LC/MS or GC/MS analysis on a sample prepared beforehand in a sample container, and acquires, as signal-intensity-value data, a set of chromatogram data at each mass-to-charge ratio corresponding to the target compound (i.e. an extracted ion chromatogram or mass chromatogram). The quantitative analyzer creates an extracted ion chromatogram from the acquired data, detects a peak corresponding to the target compound, and calculates an area value or height value of the peak. Then, the quantitative analyzer calculates, as a quantitative value, the content or concentration from the area value or height value of the peak, referring to a calibration curve prepared beforehand by an analysis of a standard sample.

The analysis result storage section stores, as an analysis result, the quantitative value for each compound, along with sample information related to the analyzed sample or in association with the sample information. If the biological sample to be analyzed is a culture supernatant as described earlier, the sample information may include, for example, a culture name, date and time of the seeding, date and time of the sampling as well as other pieces of information for identifying the lot (or the like) of the culture. The analysis result storage section is used to store the information of the quantitative values calculated by the quantitative analyzer based on the data acquired by analyses performed in a similar manner on a large number of samples by the analyzing device.

For example, when a command to display an analysis result for a specific living organism has been issued by an operator, the table creator uses the sample information to retrieve, from the analysis result storage section, analysis results for a plurality of samples originating from the same culture medium on which a biological tissue or microorganism is cultured and differing from each other in time of sampling. Subsequently, the table creator creates a table in which quantitative values are arranged for each of the plurality of target compounds as well as for each time of sampling. For one or more compounds among those target compounds, the graph creator creates, for example, a polygonal line graph which shows a temporal change of the quantitative values which differ from each other in time of sampling. The display processor displays, on the same screen of the display section, the table of the quantitative values as well as the graph showing the temporal change in quantitative value. The operator viewing this graph can quickly understand the temporal change in the content or concentration of one compound. The operator can also refer to the table as needed to know detailed values of the content or concentration of each compound.

In a preferable mode of the present invention, the system further includes an operation section configured to allow an operator to indicate a compound in the table displayed by the display processor, and the display processor is configured to display, on the same screen on which the table is displayed, a graph showing a temporal change in the quantitative value for the compound indicated through the operation section.

According to this configuration, even when the number of compounds contained in the sample is considerably large, the operator can easily and assuredly check the temporal change in the quantitative value for the compound which the operator needs to check.

In a preferable mode of the present invention, the table creator is configured to allow switching the numerical values arranged in the created table, from the quantitative values obtained for a plurality of samples at each time of sampling, to an average value of the quantitative values for the plurality of samples.

According to this configuration, when necessary, the operator can know average values of the plurality of quantitative values as numerical values.

In another mode of the present invention, the graph creator is configured to create a graph showing a temporal change in the average value of the quantitative values obtained for a plurality of samples for each time of sampling, in place of the graph showing a temporal change in quantitative value.

According to this configuration, when necessary, the operator can visually grasp the tendency of the temporal change in the average value of the quantitative values for a plurality of samples cultured under the same condition.

In the present invention, the sample information may include a culture name, date and time of the seeding, as well as the date and time of the sampling. Although the culture name can be arbitrarily given by the operator (user), it is common to give the same culture name to the same type of cells or microorganisms cultured under the same environment and conditions. Accordingly, in the case where the same type of cells or microorganisms are cultured under the same environment and conditions in a plurality of culture containers, they are given the same culture name combined with a different value of information which identifies each individual culture container, such as a culture plate number.

In this case, the graph creator in the present invention may be configured to calculate an average value of the quantitative values of a target compound in a plurality of samples which are given the same culture name and cultured under the same culture condition in culture containers that differ from each other in identification information, as well as a value representing the extent of the variation of the quantitative values, and to create, as the aforementioned graph, a graph in which the average value of the quantitative values is plotted, with an error bar representing the extent of the variation of the quantitative values. An example of the value representing the extent of the variation of the quantitative values is the standard deviation of a plurality of quantitative values.

According to this configuration, the operator can visually check the extent of the variation in quantitative value on the displayed graph. Accordingly, the operator can quickly recognize, for example, an abnormally large variation in quantitative value and closely check the quantitative values in the table.

In the present invention, the graph creator may be configured to create a graph showing a temporal change in the quantitative value of the same compound obtained from a plurality of samples having different culture names, and to superpose the created graphs, with the axes of the graphs coinciding with each other, to create one graph. In this case, the graph creator may additionally be configured to allow an operator to appropriately select culture names to be included in the graph-creating process.

According to this configuration, the operator can easily compare, on the display screen, temporal changes of the quantitative value of a compound for a plurality of samples having different culture names. This facilitates the task of visually locating, for example, a sample which differs from the other samples in terms of the tendency of the temporal change in the quantitative value of a specific compound.

In the present invention, the graph creator may be configured to create, for each of the quantitative values of the same compound obtained from a plurality of samples having different culture names, a graph showing a temporal change in the difference between the quantitative value concerned and a quantitative value obtained for a reference sample which is a sample having one of the culture names.

According to this configuration, it is easy for the operator to visually locate, on the display screen, a sample having a considerable difference from the reference sample in terms of the quantitative value of a compound, or a compound having a considerable difference from its quantitative value in the reference sample. This appropriately provides the operator with useful information for searching for optimum culture conditions or understanding the state of the cells being cultured.

Advantageous Effects of Invention

The present invention allows an operator to quickly understand the tendency of a temporal change in the quantitative value of a target compound in a sample from the graph displayed on the screen of the display section. When necessary, the operator can also refer to the table on the same screen to check quantitative values in detail. This reduces the time and labor of the task performed by the operator for understanding and checking analysis results, so that the task can be efficiently performed. Furthermore, the present invention does not require the operator to manually search for analysis results which differ from each other in the date and time of the sampling as well as create a graph for those results. This also reduces the time and labor of the operator. An incorrect understanding of the analysis results due to an incorrect operation in the task can also be avoided.

BRIEF DESCRIPTION OF DRAWINGS

FIG. 4 is one example of the property information of a culture-medium sample in the automatic culture-medium-sample analyzing system according to the present embodiment.

DESCRIPTION OF EMBODIMENTS

An automatic culture-medium-sample analyzing system as one embodiment of the automatic biological sample analyzing system according to the present invention is hereinafter described with reference to the attached drawings.

Figure 1:
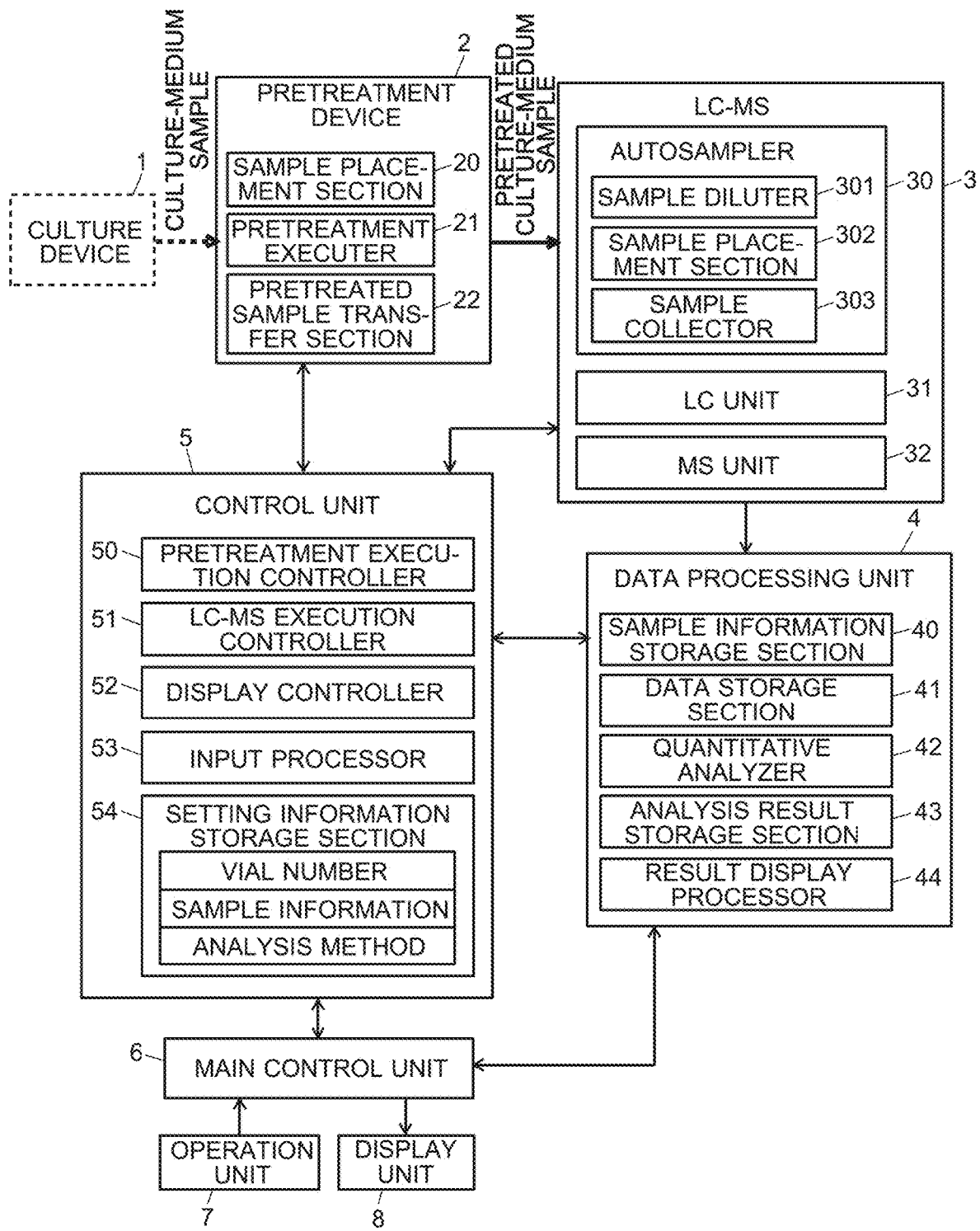
FIG. 1 is a block diagram schematically showing the configuration of an automatic culture-medium-sample analyzing system as one embodiment of the present invention.

FIG. 1 is a block diagram schematically showing the configuration of the automatic culture-medium-sample analyzing system according to the present embodiment. The system according to the present embodiment is a culture cell evaluation system to be used for evaluating the state of differentiation of test cells, such as pluripotent cells, based on the content of biomarkers (metabolites produced by the cells) in a culture supernatant of a culture medium on which the test cells are cultured.

Figure 5:
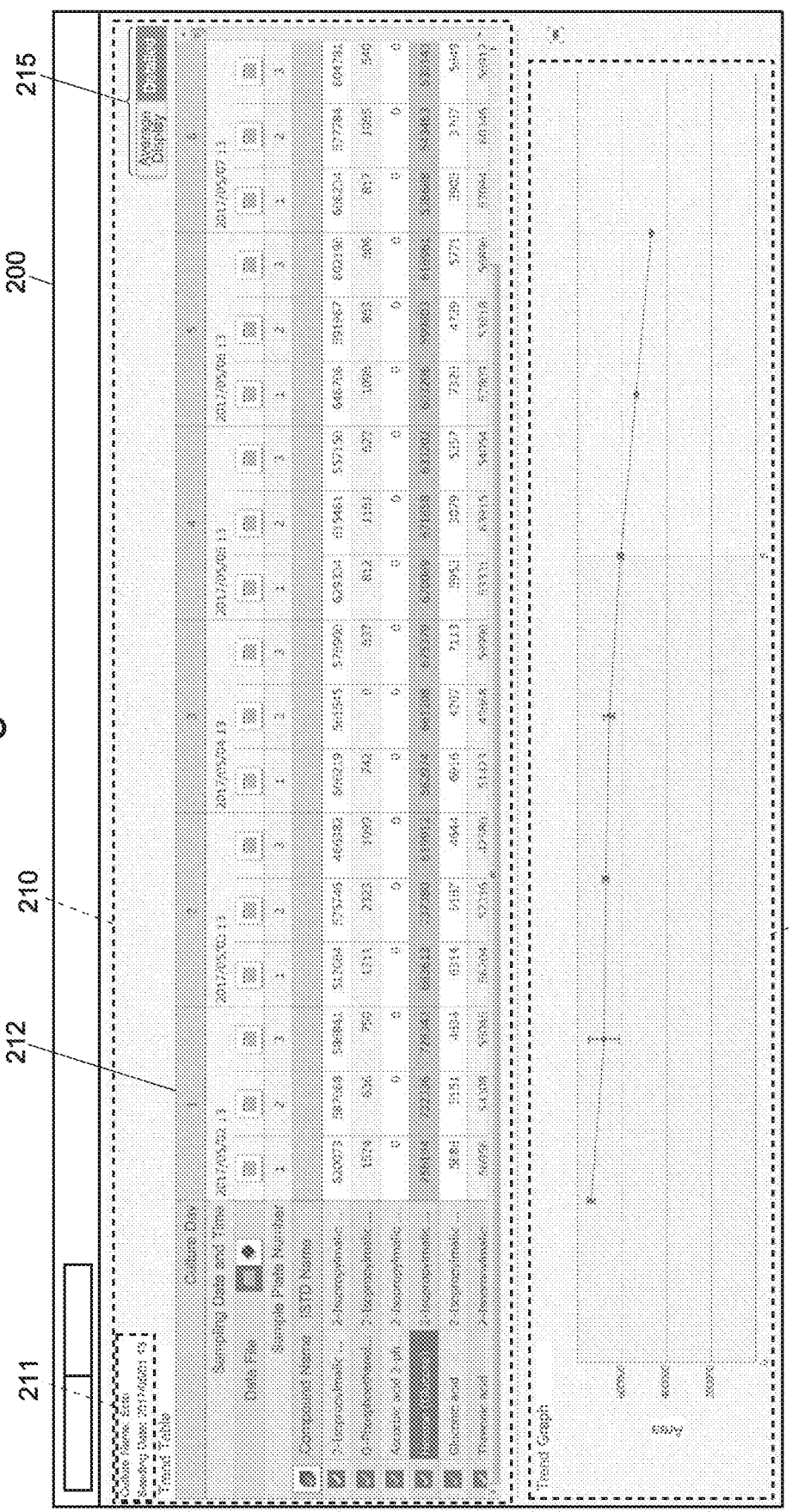
FIG. 5 is one example of an analysis result display window (main window) in the automatic culture-medium-sample analyzing system according to the present embodiment.

The system according to the present embodiment includes a pretreatment device 2, liquid chromatograph mass spectrometer (LC-MS) 3, data processing unit 4, control unit 5, main control unit 6, operation unit 7, display unit 8 and other units. The culture device 1, which is represented by the block indicated by the broken line in FIG. 5, is not included in the present system. It merely serves as a provider of culture-medium samples to be analyzed with the present system.

A rough description of the present system is as follows: A considerable number of culture-medium samples obtained in the culture device 1 are provided to the pretreatment device 2. A predetermined pretreatment is sequentially performed on those culture-medium samples in the pretreatment device 2. Each culture-medium sample which has been pretreated by the pretreatment device 2 ("pretreated sample") is sent to the LC-MS 3. In the LC-MS 3, the components in each culture-medium sample are sequentially analyzed. The data acquired by this analysis is sent to the data processing unit 4. The data processing unit 4 processes those data by a predetermined method. The result of the analysis is sent through the main control unit 6 to the display unit 8 and presented to the user operator). The control unit 5 controls the pretreatment device 2, LC-MS 3 and data processing unit 4 for the previously described processing. The main control unit 6 mainly has the function of the user interface through the operation unit 7 and the display unit 8.

Detailed descriptions of the configuration of each unit are as follows:

The culture device 1 is a device for culturing test cells. For example, the test cells may be stem cells, which are typically pluripotent stem cells, such as ES cells or iPS cells. Cells obtained by differential induction from stem cells may also be used as the test cells. For the culturing of those types of test cells, various culture media generally used for the culturing of stem cells can be used, such as DMEM/F12 or culture media which contain DMEM/F12 as the main component (e.g. mTeSR1). While cells are being cultured on such a culture medium, various metabolites produced by the cells are mixed into the culture supernatant. The operator manually collects a portion of the culture supernatant and injects it into a predetermined vial (sample container) to prepare a culture-medium sample. Needless to say, it is possible to configure the system to automatically collect a portion of the culture supernatant at a fixed time every day, i.e. to automatically prepare culture-medium samples.

The pretreatment device 2 includes a sample placement section 20, pretreatment executor 21 and pretreated sample transfer section 22. The sample placement section 21 includes a sample rack on which a large number of vials are to be placed. The pretreatment executor 21 performs pretreatment on a culture-medium sample in one vial selected from a large number of vials placed on the sample placement section 20, to remove unnecessary components (e.g. proteins) through the steps of sample dispensing, reagent dispensing, stirring, filtering, as well as other related operations. The pretreated sample transfer section 22 transfers a container in which a pretreated culture-medium sample is temporarily contained to a predetermined position in the LC-MS 3.

In the present example, as will be described later, the sample rack used in the pretreatment device 2 is substantially arc-shaped as viewed from above. The sample placement section 20 has six sample racks arranged along the circumference of a ring. One sample rack allows ten or eleven vials to be placed. Specifically, each sample rack has a plurality of cavities each of which is sized so that it can receive the bottom portion of one vial, thereby allowing one vial to be placed in each cavity.

The pretreatment for removing proteins may specifically be such that isopropylmalic acid acting as the internal standard sample is added as a reagent to the culture-medium sample, and the sample is subsequently treated with an extracting solution which for example contains methanol, chloroform and water mixed at a ratio of 2.5:1:1. It should be noted that the pretreatment is not limited to the removal of proteins. A different kind of pretreatment may be performed on the culture-medium sample. As for the pretreatment device 2, a device disclosed in Patent Literature 4, Non Patent Literature 2 or other related documents may be used, although the devices available for the present invention are not limited to those examples.

The LC-MS 3 includes: a liquid chromatograph (LC) unit 31, which includes a liquid supply pump, injector, column and other components (not shown); an autosampler 30 configured to select one of the large number of culture-medium samples and introduce it into the LC unit 31; and a mass spectrometer (MS) unit 32 configured to perform a mass spectrometric analysis for each of the components in the sample temporally separated by the column of the LC unit 31. The autosampler 30 includes a sample placement section 302, sample dilutor 301, and sample collector 303.

The sample placement section 302 includes a sample rack on which a large number of vials different from those used in the pretreatment device 2 are to be placed. The sample dilutor 301 draws the pretreated culture-medium sample from the container transferred to the predetermined position by the pretreated sample transfer section 22 of the pretreatment device 2, adds ultrapure water to the sample to dilute it to a predetermined rate, and dispenses the diluted sample into a vial placed on the sample placement section 302. The sample collector 303 collects a predetermined amount of pretreated and diluted culture-medium sample from one of the large number of vials placed on the sample placement section 302, and introduces the sample into the injector of the LC unit 31.

In the present example, as will be described later, the sample rack used in the autosampler 30 has a rectangular shape as viewed from above. One sample rack can hold vials arranged in the form of a matrix with n rows and in columns (in the present example, 12 rows and 8 columns).

In order to evaluate the state of differentiation of the test cells, a mass spectrometric analysis is performed in the MS unit 32, with at least one compound as the target selected from a group of biomarkers which include, for example, putrescine, kynurenine, cystathionine, ascorbic acid, riboflavin, pyruvic acid, serine, cysteine, threonic acid, citric acid, and orotic acid. There is no specific limitation on the type of mass spectrometer to be used as the MS unit 32 as long as it is equipped with an atmospheric pressure ionization source. For example, a quadrupole mass spectrometer, tandem quadrupole mass spectrometer, or quadrupole time-of-flight mass spectrometer can be used.

The data processing unit 4 includes a sample information storage section 40, data storage section 42, quantitative analyzer 42, analysis result storage section 43, result display processor 44 and other functional blocks. The sample information storage section 40 is used to store sample information which is entered and set for each vial containing a culture-medium sample in the pretreatment device 2, as will be described later. The data storage section 41 is used to store data collected by analyses performed in the LC-MS 3. The quantitative analyzer 42 is configured to create an extracted ion chromatogram for each set of data acquired for a specific compound chosen as the target, and to calculate a concentration value (or the like) of the compound based on the area value or height value a peak observed on the chromatogram, using a previously created calibration curve. The analysis result storage section 43 is used to store calculated results obtained by the quantitative analyzer 42 or other related sections. The result display processor 44 is configured to create a graph based on the calculated analysis results (and the like), as well as create a window in a predetermined form, with the graph displayed on the window, and output the window through the main control unit 6 to the display unit 8.

The control unit 5 includes a pretreatment execution controller 50, LC-MS execution controller 51, display controller 52, input processor 53, setting information storage section 54 and other functional blocks. The pretreatment execution controller 50 is configured to control pretreatment operations in the pretreatment device 2. The LC-MS execution controller 51 is configured to control analysis operations in the LC-MS 3. The display controller as will be described later, is configured to create a window which displays the state of operation in the pretreatment device 2 and the LC-MS 3, as well as a window on which the operator sets information concerning culture-medium samples provided to the pretreatment device 2 (sample information), analysis conditions for each sample and other related kinds of information, and to output the window through the main control unit 6 to the display unit 8. The input processor 53 is configured to execute predetermined processing according to an input operation performed by the operator using the operation unit 7. The setting information storage section 54 is used to store sample information, analysis conditions and other pieces of information for each culture-medium sample, entered and set by input operation by an operator or other types of operation.

The data processing unit 4, control unit 5 and main control unit 6 are actually a personal computer (or more sophisticated workstation), with the functions of the previously described blocks realized by executing, on the computer, one or more pieces of dedicated software previously installed on the same computer. In this configuration, the operation unit 7 includes the keyboard and pointing device (e.g. mouse) attached to the personal computer (or the like), while the display unit 8 is the display monitor.

As described earlier, in the present system, a culture-medium sample contained in one of the large number of vials placed in the sample placement section 20 in the pretreatment device 2 undergoes the pretreatment and diluting operation, to be injected into one of the large number of vials placed on the sample placement section 302 in the autosampler 30. Accordingly, the large number of vials placed on the sample placement section 20 in the pretreatment device 2 can be related to the large number of vials placed on the sample placement section 302 on a one-to-one basis. In order to help the operator easily and correctly understand the correspondence relationship between the two groups of vials, the present system performs a characteristic display control. A description of the display control is hereinafter given.

Figure 2:
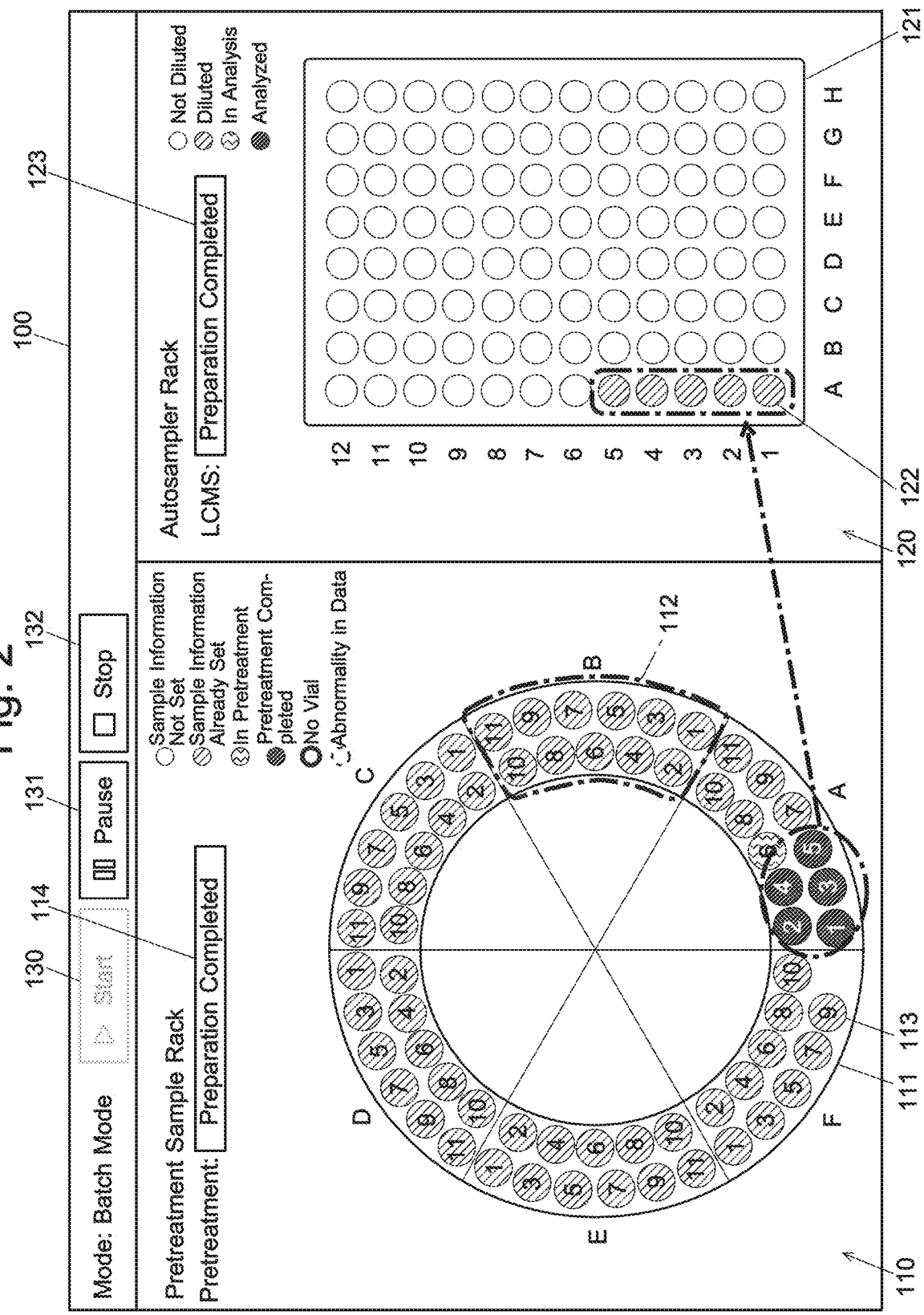
FIG. 2 is a model diagram showing one example of a device status check window to be displayed on a display unit in the automatic culture-medium-sample analyzing system according to the present embodiment.

An operator performs a predetermined operation using the operation unit 7. Then, the display controller 52 receives an instruction through the main control unit 6 and displays a device status check window in a predetermined form on the screen of the display unit 8. FIG. 2 is a model diagram showing one example of the device status check window 100. This device status check window 100 is a window for simultaneously displaying information concerning both the operation of the pretreatment device 2 and that of the LC-MS 3. More specifically, the device status check window 100 is roughly divided into right and left areas, with the left area forming a pretreatment status display area 110 and the right area forming an analysis status display area 120.

In the pretreatment status display area 110 of the device status check window 100, a first sample arrangement image 111, which graphically shows a top-view image of the sample placement section 20 in the pretreatment device 2, is displayed. The first sample arrangement image 111 is divided into six arc-shaped areas 112 corresponding to the six substantially arc-shaped sample racks arranged along the circumference of a ring, as with the real sample placement section 20. Each arc-shaped area 112 has circular areas 113 which respectively correspond to a plurality of vials (in the present example, 11 vials).

As shown in FIG. 2, the six arc-shaped areas 112 are given the Roman alphabetic characters of "A", "B", "C", "D", "E" and "F" as their area names, respectively. The circular areas 113 within each arc-shaped area 112 are given serial numbers of "1" to "11", respectively. Each circular area 113 within the first sample arrangement image 111 is identified by a vial number which is the combination of a Roman alphabetic character representing the arc-shaped area 112 to which the circular area 113 belongs and the serial number which is given to the circular area 113 within the arc-shaped area 112. The vial placed at the position corresponding to the circular area 113 is assigned the vial number as its identification number.

The display color of each circular area 113 shows the execution status (or the like) of the pretreatment on the culture-medium sample in the vial at the position corresponding to that circular area 113. Specifically, there are six kinds of execution status (or the like) of the pretreatment represented by the color: "Sample Information Not Set", which means that the sample name and other pieces of sample information are not yet set; "Sample Information Already Set", which means that the sample information has already been set, but the pretreatment has not yet been performed; "In Pretreatment", which means that the pretreatment is being performed; "Pretreatment Completed", which means that the pretreatment has been completed; "No Vial", which means that no vial is present at the position concerned; and "Abnormality in Data", which means that an abnormality has occurred in the pretreatment. It should be noted that, due to the restriction on the drawing in which color representation is not allowed, the execution status (or the like) of the pretreatment is represented by varying the filling pattern, type of line indicating the area or other elements of the drawing.

In the example of FIG. 2, the circular areas 113 corresponding to the five vials with vial numbers "A1" to "A5" are in the state of "Pretreatment Completed". The circular area 113 corresponding to one vial with vial number "A6" is in the state of "In Pretreatment". The other circular areas are all in the state of "Sample Information Already Set".

Located above the first sample arrangement image 111 in the pretreatment status display area 110 is an operation status display section 114 for showing the operation status of the pretreatment device 2. In the present example, since the system is in the preparation-completed state in which the pretreatment operation in the pretreatment device 2 can be performed, "Preparation Completed" is displayed in the operation status display section 114, This display in the operation status display section 114 changes with the situation. For example, "Halted" is displayed when the pretreatment device 2 is halted, or "In Preparation" when the pretreatment device 2 has already been energized but is not yet completely ready for the operation.

On the other hand, in the analysis status display area 120 of the device status check window 100, a second sample arrangement image 121 which graphically shows a top-view image of the sample placement section 302 in the autosampler 30 is displayed. As with the real sample placement section 302, the second sample arrangement image 121 has circular areas 122 which respectively correspond to a plurality of vials arranged in the form of a matrix with n rows and m columns (in the present example, 12 rows and 8 columns).

As shown in FIG. 2, the columns in the second sample arrangement image 121 are assigned the Roman alphabetic characters of "A", "B", "C", "D", "E", "F", "G" and "H", respectively, while the rows are given serial numbers of "1" to "12", respectively. Each circular area 122 within the second sample arrangement image 121 is identified by a vial number which is the combination of a Roman alphabetic character and a number according to the position of the circular area 122 in the row and column directions. The vial located at the position corresponding to the circular area 122 is assigned that vial number as its identification number.

The display color of each circular area 122 shows the status of the diluting operation in the autosampler 30 on the pretreated and diluted culture-medium sample in the vial at the position corresponding to the circular area 122 as well as the execution status (or the like of the analysis in the LC unit 31 and the MS unit 32. Specifically, there are four kinds of status of the diluting operation and execution of the analysis represented by the color: "Not Diluted", which means that the diluting process has not yet been performed; "Diluted", which means that the diluting process has been completed, but the measurement has not yet been performed; "In Analysis", which means that the analysis is being performed; and "Analyzed", which means that the analysis has been completed. Once again, the status of the diluting operation and the execution status (of the like) of the analysis are represented by the variation of the filling pattern or other elements of the drawing in place of the color.

In the example of FIG. 2, the circular areas 122 corresponding to the five vials with vial numbers "A1" to "A5" are in the state of "Diluted". The circular areas 122 corresponding to the other vials are all in the state of "Not Diluted". As described earlier, in the present system, a culture-medium sample which has been diluted is injected into each vial. Therefore, a circular area 122 whose status is "Not Diluted" means that no culture-medium sample has yet been injected into the vial located in this circular area.

Located above the second sample arrangement image 121 in the analysis status display area 120 is an operation status display section 123 for showing the operation status of the LC unit 31 and the MS unit 32. In the present example, since the system is in the preparation-completed state in which the LC unit 31 and the MS unit 32 are ready for operation, "Preparation Completed" is displayed in the operation status display section 123. This display in the operation status display section 123 changes with the situation. For example, "Halted" is displayed when the LC unit 31 and the MS unit 32 are halted, or "In Preparation" when those units have already been energized but are not yet completely ready for the operation.

In the uppermost portion of the device status check window 100, a "Start" button 130 to be operated for initiating an analysis, a "Pause" button 131 to be operated for pausing the analysis, and a "Stop" button 132 to be operated for terminating the analysis are arranged, After selecting a previously registered analysis method, an analysis operator can instruct the system to initiate a series of analyses, inclusive of the pretreatment, by performing the clicking operation on the "Start" button 130. It should be noted that FIG. 2 shows the situation in which the "Start" button 130 has already been operated and the analysis has been under way.

As described earlier, in the device status check window 100, the vials placed on the sample placement section 20 in the pretreatment device 2 and those placed on the sample placement section 302 in the autosampler 30 are related to each other by the same set of vial numbers. Therefore, the operator can easily locate a vial in one sample placement section 20 or 302 which contains a sample that is identical (except for the pretreatment or dilution) to the sample contained in a vial in the other sample placement section 302 or 20.

The display also makes it easy to understand in what stage of the pretreatment or analysis the culture-medium sample in the vial placed in each of the sample placement section 20 or 302 is. For example, as indicated by the long dashed short dashed lines in FIG. 2, it is easy to understand that the culture-medium samples in the five vials with vial numbers "A1" to "A5" in the first sample arrangement image 111 have already undergone the pretreatment in the pretreatment device 2, and those samples have been transferred to the autosampler 30 and have already been diluted, as shown in the second sample arrangement image 121.

In the example shown in FIG. 2, the sample information has been set for all vials placed on the sample placement section 20 of the pretreatment device 2, and the analysis has already been initiated. On the other hand, before the initiation of the analysis, the operator enters and sets sample information for the culture-medium sample in each vial for all vials placed on the sample placement section 20 of the pretreatment device 2. Furthermore, the operator enters and sets analysis conditions for analyzing each culture-medium sample with the LC-MS 3. The sample information includes the date and time of the seeding, culture name, culture plate number, date and time of the sampling, as well as other related information. The set sample information and the analysis method including the set analysis conditions are associated with the vial number and stored in the setting information storage section 54. One method for setting the sample information is as follows.

Figure 3:
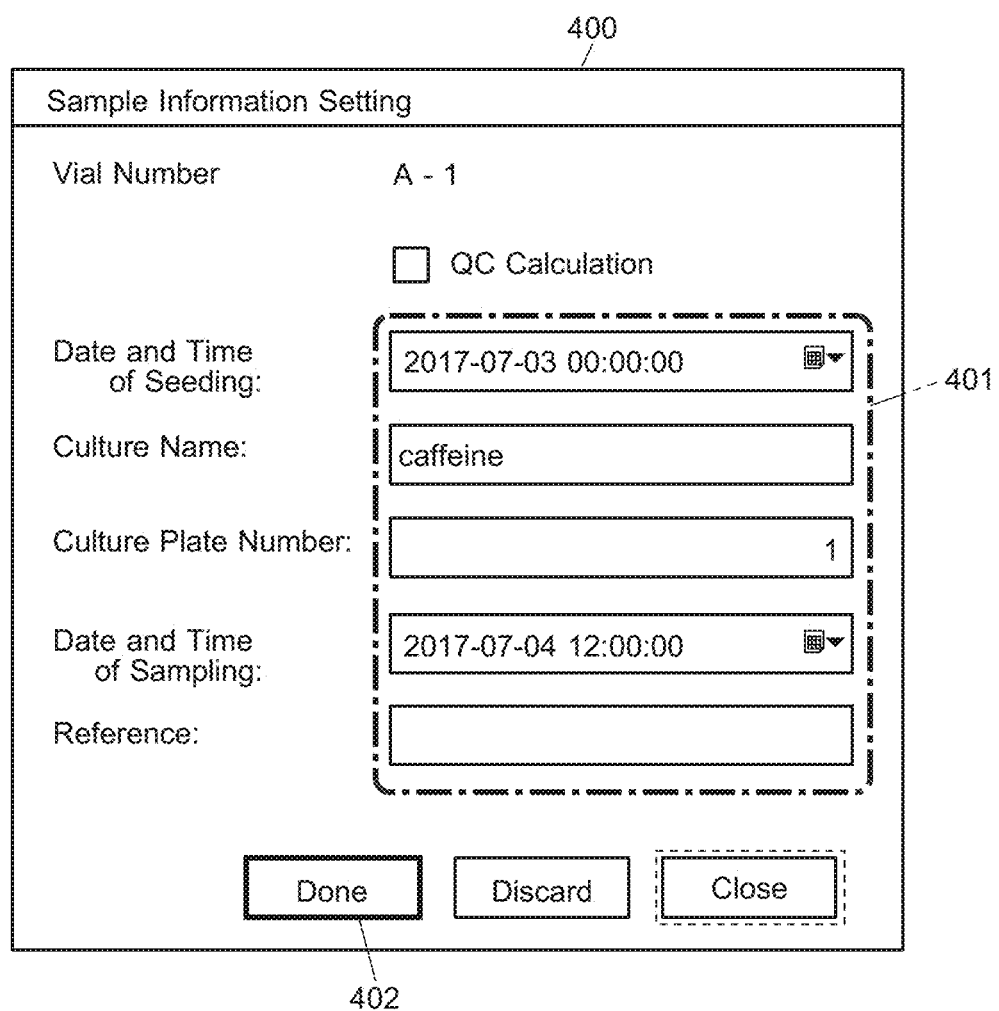
FIG. 3 is one example of a sample information setting window in the automatic culture-medium-sample analyzing system according to the present embodiment.

If there is a vial for which no sample information is set in the first sample arrangement image 111 on the device status check window as shown in FIG. 2, the operator performs the clicking operation on the circular area 113 corresponding to the vial for which the sample information should be set, using the pointing device included in the operation unit 7. In response to this operation, the display controller 52 newly opens a sample information setting window 400 corresponding to the indicated vial number, and displays it on the screen of the display unit 8, as shown in FIG. 3. FIG. 3 is an example in which the circular area 113 having vial number "A1" has been indicated.

In the sample information setting window 400, a group of text boxes 401 are arranged for inputting the date and time of the seeding, culture name, culture plate number, date and time of the sampling, reference and other items of sample information. "Reference" is a value to be used as needed for the calculation or processing of analysis results, as will be described later. For example, it may be a value of an appropriate item of information acquired through a measurement or observation in a separate device which is not included in the present system, such as the number of cells in the original culture container from which the culture-medium sample in question was collected, level of lactate (the amount of substance produced when sugar is consumed), fungus concentration, or absorbance of the culture solution.

The operator enters or selects appropriate information for each of the previously mentioned items related to the sample information, and subsequently performs the clicking operation on the "Done" button 402. In response to this operation, the input processor 53 fixes the sample information for the vial number concerned, creates a sample information file including sample information for each vial number, and stores the file in the setting information storage section 54.

According to the previously described procedure, the operator needs to enter and set sample information for each vial. It is also possible to collectively enter and set sample information for a plurality of vials, by preparing a table in which the date and time of the seeding, culture name, culture plate number, date and time of the sampling, and other items of sample information are collected for a plurality of vials, i.e. culture-medium samples, and allowing the operator to select and indicate a plurality of vials for which no sample information has yet been set, and select a plurality of pieces of sample information corresponding to the selected vials on the table.

As described earlier, the input processor 53 stores a sample information file containing sample information for each vial in the setting information storage section 54. Along with this operation, the input processor 53 automatically registers the information of each item of the sample information in a custom property, which is one item of the property information of the file. FIG. 4 shows one example of the file property dialog box 410, with the sample information automatically registered in the custom property 411 on the dialog box. In the present case, the type of custom-property value is "Text". The values of the date and time of the seeding, date and time of the sampling, culture name, culture plate number and QC value are registered as the values which respectively correspond to the names of "C2MAP_CultureStartingDate", "C2MAP_CultureSamplingDate", "C2MAP_CultureName", "C2MAP_CulturePlateNumber" and "C2MAP_QC".

The file which contains sample information that has been set for each vial in the control unit 5 as described earlier is transferred to the data processing unit 4 at an appropriate point in time, and is also stored in the sample information storage section 40.

The data format of the file in which sample information is stored may possibly vary depending on the manufacturer of the present system. On the other hand, the file property can be commonly used as long as the system is based on the same operating system, such as Windows® Operating System. For example, if the manufacturer of the pretreatment device 2 in the present system is different from that of the LC-MS 3, the data processing unit 4 for processing data acquired with the LC-MS 3 may be unable to read data from the file which contains the sample information. Even in that case, the property of the file can be used to retrieve the sample information.

Modes of the display of the analysis results after the execution of the analysis for a large number of samples in the present system are hereinafter described.

As described earlier, the data collected by performing analyses in the LC-MS 3 for a large number of culture-medium samples are stored in the data storage section 41. Using those data, the quantitative analyzer 42 creates an extracted ion chromatogram for one or more predetermined compounds for each vial, and calculates the area value of the peak corresponding to each compound. Furthermore, the quantitative analyzer 42 calculates a concentration value from the peak area value, referring to the previously created calibration curve. Thus, the peak area value and concentration value of one or more compounds are determined for each vial, i.e. for each culture-medium sample. Those values are stored in the form of one file in the analysis result storage section 43.

This file of the analysis result created for each sample and stored in the analysis result storage section 43 is linked with a file which contains data including the sample information related to the same culture-medium sample stored in the sample information storage section 40. The data file stored for each sample in the data storage section 41 is also linked with the file of the sample information. Therefore, for example, it is easy to access from a piece of sample information the analysis-result file or data file related to the sample concerned, and conversely, to retrieve sample information concerning the sample from the analysis-result file or data file. This consequently enables proper management of the traceability of the analysis.

A culture-medium analysis using the present system is normally performed in such a manner that a culture supernatant in one culture container is continuously analyzed, for example, at the same time every day until the completion of the culturing, in order to evaluate the state of differentiation of the test cells being cultured. Therefore, culture-medium samples having the same name are analyzed every day, with data files and analysis-result files created and stored every day. Since the amounts of compounds (e.g. metabolites produced by the cells) in the culture-medium sample collected from the same culture container change on a daily basis, observing the temporal change is essential for the cell evaluation. The present system is configured to display a graph based on an analysis result, along with the corresponding sample information, as will be hereinafter described.

Figure 6:
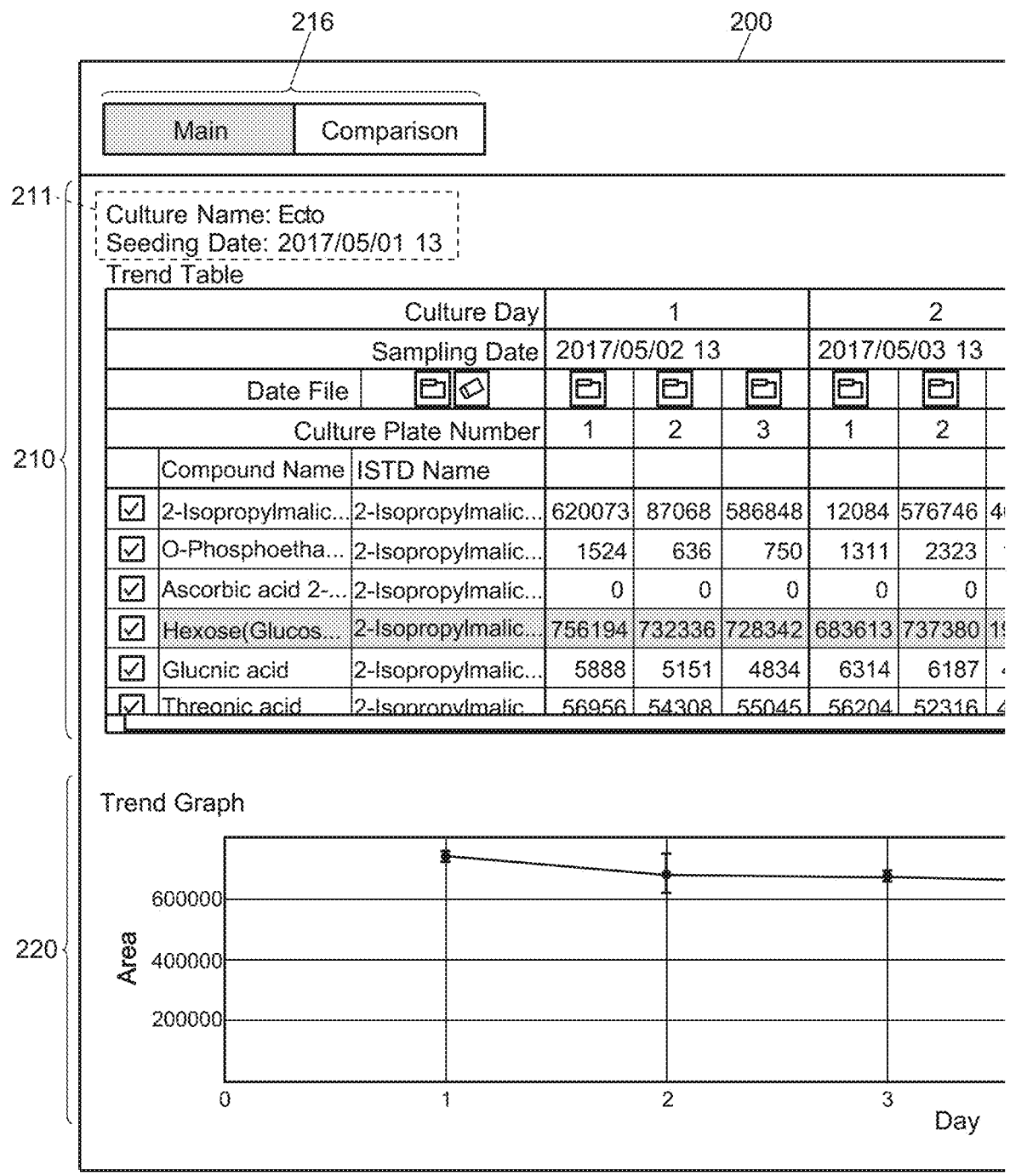
FIG. 6 is a left portion of the analysis result display window shown in FIG. 5.

The operator using the operation unit 7 specifies the culture name and other necessary items of information, as well as performs a predetermined operation. Then, the result display processor 44 reads the sample-information file and the analysis-result file corresponding to the specified information from the sample information storage section 40 and the analysis result storage section 43. Based on the data in those files, the result display processor 44 creates a "trend table" in which quantitative, values (or average values of the quantitative values) are arranged, as will be described later, as well as a "trend graph" which shows a temporal change in the average value of the quantitative values (or temporal change in quantitative value itself), and creates a main analysis result display window 200 as shown in FIGS. 5 and 6, with the table and graph arranged within the window. This window 200 is displayed on the display unit 8. FIG. 5 shows the entirety of the main analysis result display window 200, while FIG. 6 shows a left portion of the analysis result display window 200. The main analysis result display window 200 is roughly divided into upper and lower areas, with the upper area forming a table display area 210 and the lower area forming a graph display area 220.

In the upper left portion of the table display area 210, a sample information display area 211 is provided for displaying the culture name and the date and time of the seeding as the sample information. A trend table 212 is located below this area. The trend table 212 is a table in which the kinds of compounds (metabolites) to be analyzed are vertically arranged, while the culture plate numbers are horizontally arranged, grouped by the culture day (the number of days which have passed since the beginning of the culturing) as well as in order of the date and time of the sampling. In the present example, since the number of culture containers (culture plates) cultured under the same conditions is three, there are only three culture plate numbers of 1, 2 and 3. This number may be further increased.

The result display processor 44 displays a quantitative value in each cell of the trend table 212, where each quantitative value corresponds to one kind of compound, one culture day and one culture plate number. The "quantitative value" in the present context is any one of the following values: the peak area value; an area ratio relative to the peak area value under specific conditions (e.g. an area ratio with the area value on the first day of the date and time of the sampling defined as 1); the concentration value; a concentration ratio relative to the concentration value under specific conditions (e.g. a concentration ratio with the concentration value on the first day of the date and time of the sampling defined as 1); and a calculated value obtained by dividing any one of the previously listed values by the value of the aforementioned reference. The operator can appropriately select, on a separate setting window, which value should be displayed as the quantitative value. In any case, the analysis results calculated by the quantitative analyzer 42 for each compound are displayed in this table.

In the upper right portion of the table display area 210, a detailed mode/average display mode selection button 215 is provided. FIGS. 5 and 6 show the situation in which the detailed mode is selected with this button 215. In this mode, all results obtained on the same day for the three samples with different culture plate numbers are shown. On the other hand, if the average display mode is selected with the detailed mode/average display mode selection button 215, the result display processor 44 calculates, for each compound, an average of the results obtained for the three samples with different culture plate numbers on the same date and time of the sampling, and displays the average values in the trend table 212. In normal cases, checking the average value by the average display mode is sufficient, since there is inevitably a variation in the multiplication or other aspects of the cells even when those cells are cultured under the same conditions, causing a certain extent of variation among the results obtained for the three samples on the date and time of the sampling. However, for example, if the results are questionable, the detailed display mode can be selected to examine the individual peak area values or concentration values and check for an abnormal value (or the like).

In the graph display area 220 of the main analysis result display window 200, a graph which shows a change in the peak area value (or like) of one compound selected in the trend table 212 ("trend graph") is displayed. The operator using the operation unit 7 indicates, on the trend table 212, a compound whose trend graph needs to be checked. The result display processor 44 collects analysis results for the indicated compound, creates a trend graph and renews the display in the graph display area 220. In the example of FIG. 5, the fourth row of the trend table 212, "Hexose (Glucose)", is selected, and a trend graph showing the change in the peak area value for this compound is displayed. Each value on this graph is an average value for the three samples with different culture plate numbers on the same date and time of the sampling, with the error bar indicating the extent of the variation of the values. The value to be used for the error-bar indication can be selected by the operator from the variance, standard deviation and other choices on a separate setting window.

If there is an error bar which indicates an abnormally large variation of the value, it is most likely that some abnormality has occurred. Accordingly, the system may be configured to allow the operator to specify a threshold of the amount of error on a separate setting window. When there is an error that exceeds the threshold, the system can alert the operator to the presence of an abnormal amount of error by appropriate measures, e.g. by displaying the error bar in a color that is different from the normal display color. It is also possible to configure the system so that a predetermined operation by the operator replaces the trend graph showing the average value of the quantitative values with a trend graph which shows the quantitative values as they are.

The main analysis result display window 200 allows for the check of a trend graph for a single indicated culture name. When it is necessary to compare the results obtained for a plurality of culture-medium samples with different culture names, the operator selects the comparison mode with a main mode/comparison mode selection button 216 shown in the topmost portion of the main analysis result display window 200. Then, the result display processor 44 displays a comparative analysis result display window 300 on the display unit 8, as shown in FIG. 7.

Figure 7:
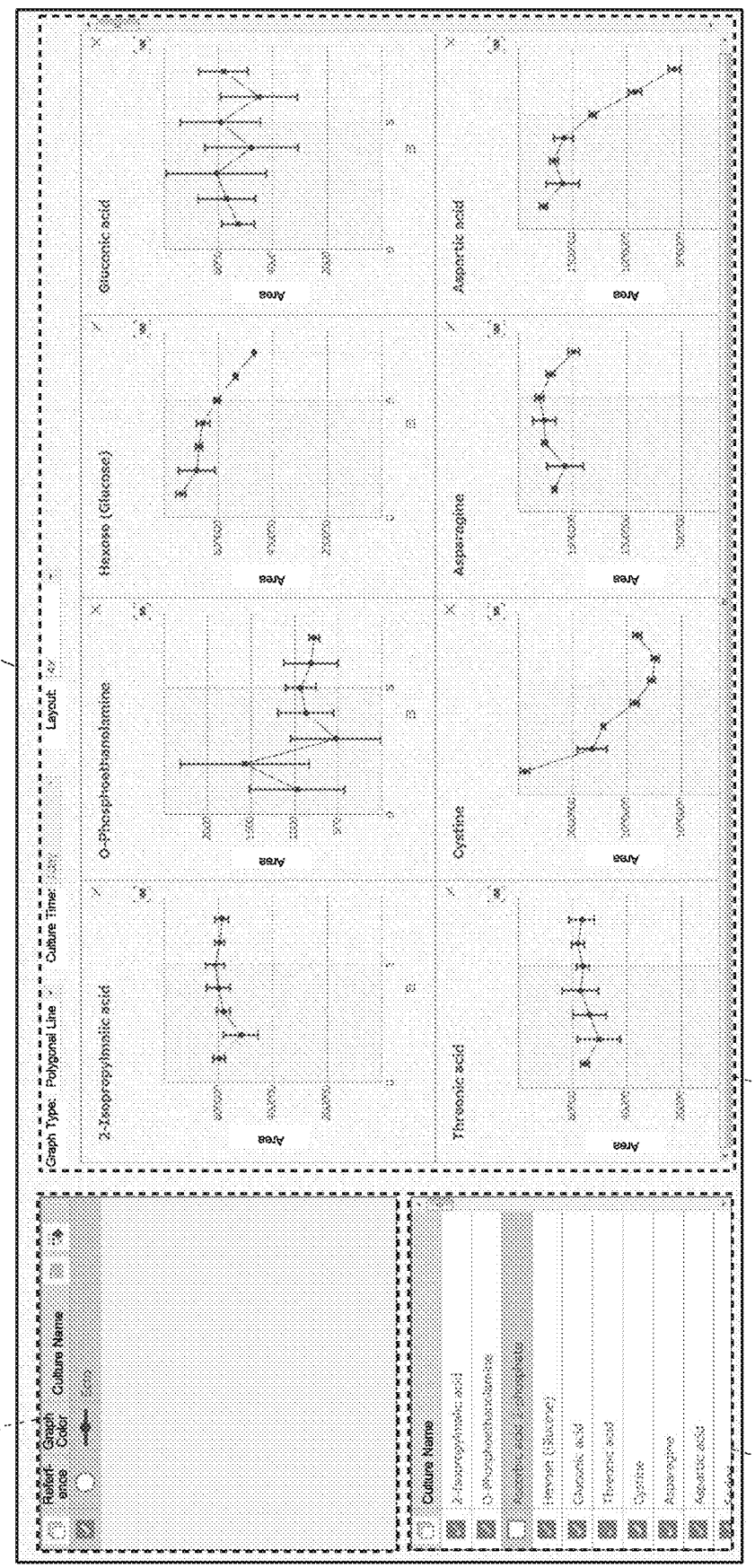
FIG. 7 is one example of an analysis result display window (comparison window) in the automatic culture-medium-sample analyzing system according to the present embodiment.
Figure 8:
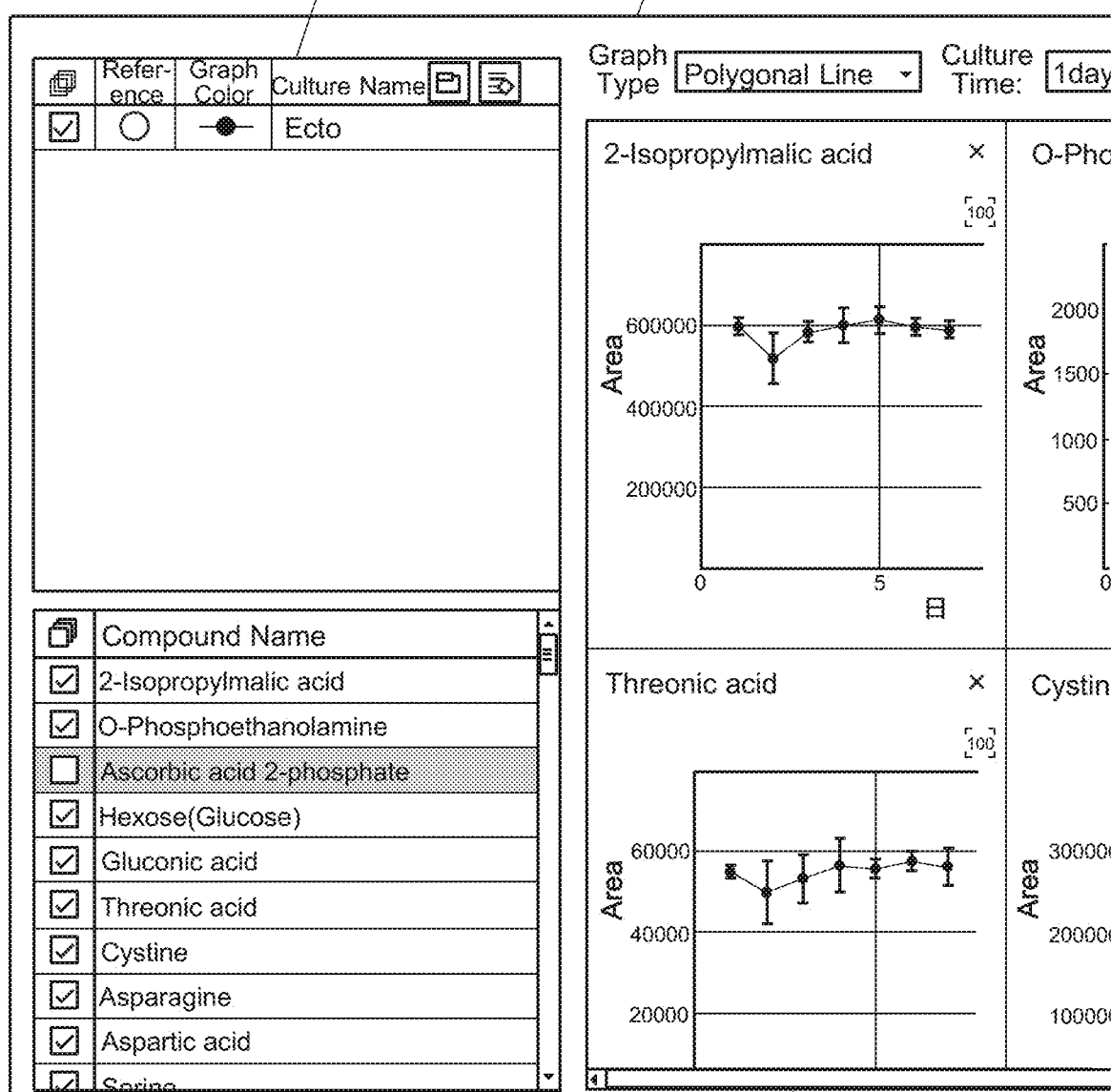
FIG. 8 is a left portion of the analysis result display window shown in FIG. 7.

FIG. 7 shows the entirety of the comparative analysis result display window 300, while FIG. 8 shows a left portion of the comparative analysis result display window 300. The analysis result display window 300 is roughly divided into three areas, with the upper left area forming a sample kind table display area 310, the lower left area forming a compound table display area 320, and the right area forming a graph display area 330. The sample kind table display area 310 shows a sample kind table in which one row corresponds to one culture name. The compound table display area 320 shows a compound table in which one row corresponds to one compound. The sample kind table and the compound table have a check box in each row. Trend graphs, which show analysis results for the rows with the checked boxes, are shown in the graph display area 330.

In the example of FIGS. 7 and 8, trend graphs of the compounds, exclusive of ascorbic acid 2-phosphate, for a culture-medium sample with culture name "Ecto" are shown in the graph display area 330. Each trend graph itself is the same as the one displayed in the graph display area 220 of the main analysis result display window 200. The average value of the peak area value, concentration value or the like with the error bar is displayed for each sampling date. This facilitates the task of comparing different compounds in terms of the temporal change in peak area value (or the like).

Figure 9:
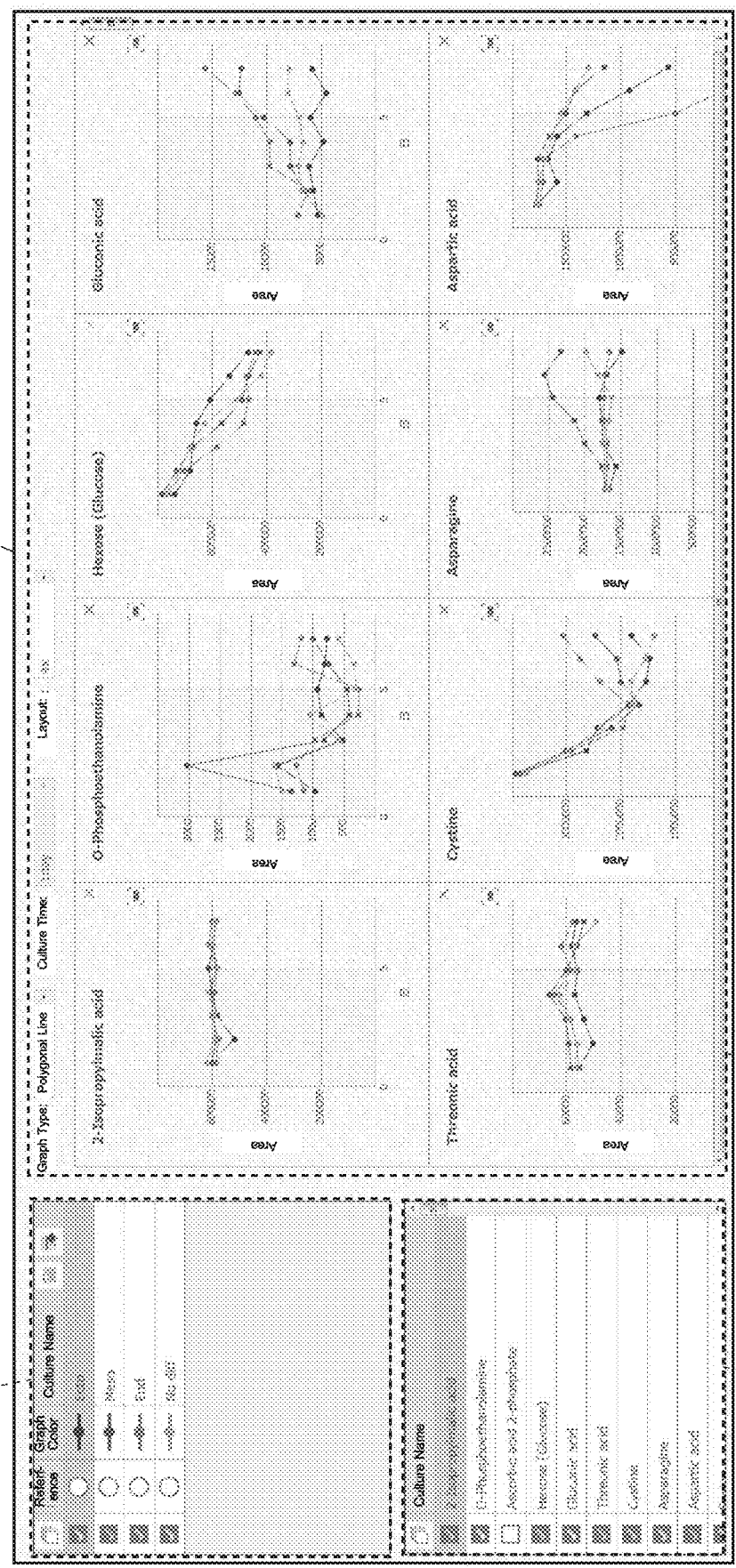
FIG. 9 is one example of an analysis result display window (comparison window) in the automatic culture-medium-sample analyzing system according to the present embodiment.
Figure 10:
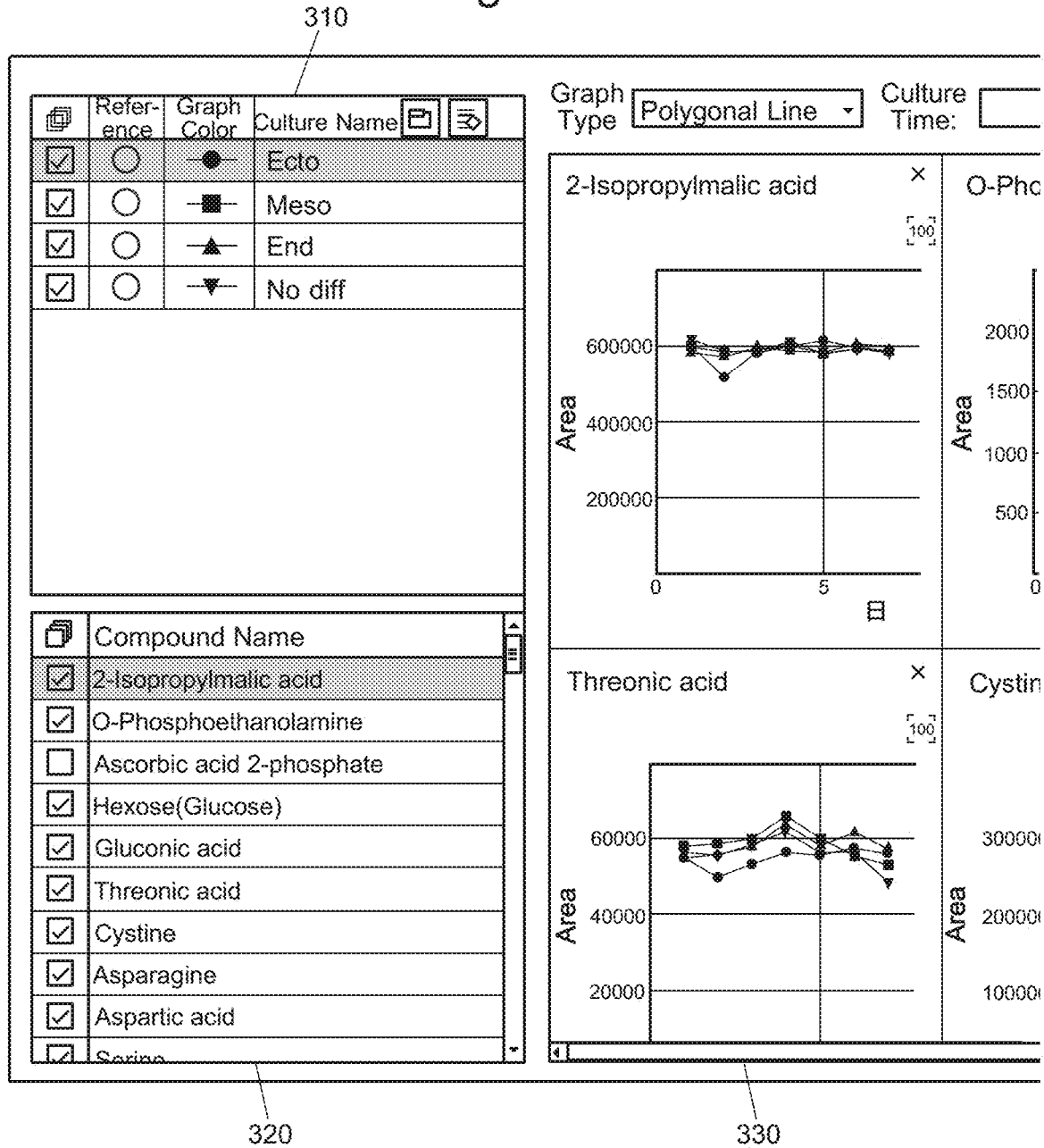
FIG. 10 is a left portion of the analysis result display window shown in FIG. 9.

It is also possible to compare the analysis results of culture-medium samples with different culture names in the comparative analysis result display window 300 as follows: The operator specifies, on a separate setting window, a plurality of culture names to be compared. Then, the result display processor 44 displays a comparative analysis result display window 300 on the display unit 8 as shown in FIGS. 9 and 10. FIG. 9 shows the entirety of the comparative analysis result display window 300, while FIG. 10 shows a left portion of the comparative analysis result display window 300. In the sample kind table display area 310 of this window, a sample kind table listing the specified culture names is displayed. Each culture name is assigned a different graph color. However, since color representation is not allowed in the drawing, the difference is represented by varying the shape of the points plotted on the graph.

Trend graphs in which polygonal line graphs corresponding to the samples with different culture names are superposed are displayed in the graph display area 330. In the example of FIGS. 9 and 10, trend graphs of the compounds, exclusive of ascorbic acid 2-phosphate, for four culture-medium samples with culture names "Ecto", "Meso", "End" and "No diff" are shown in the graph display area 330. This facilitates the task of comparing different culture cells in terms of the change in the quantitative value of the same compound.

Figure 11:
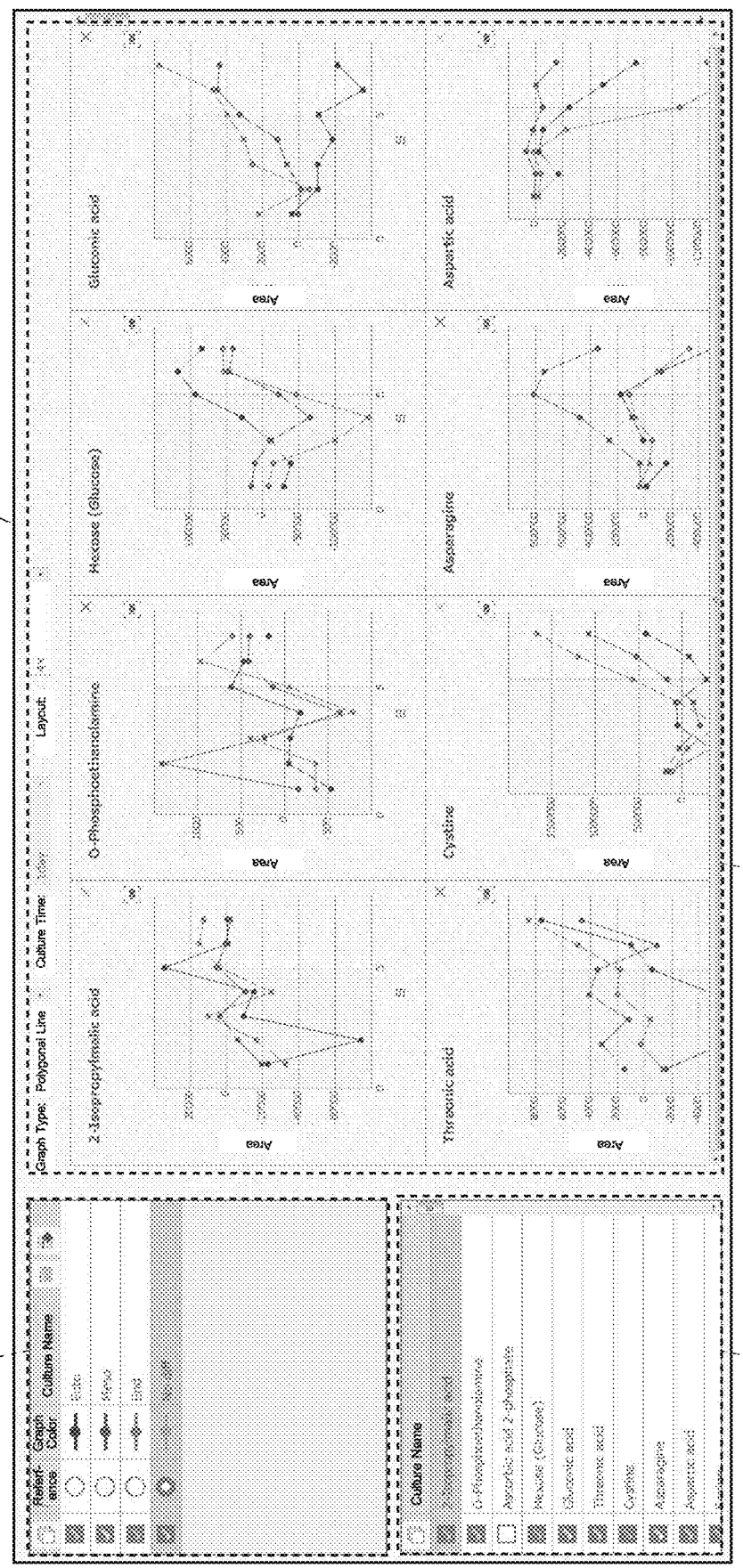
FIG. 11 is one example of an analysis result display window (comparison window) the automatic culture-medium-sample analyzing system according to the present embodiment.
Figure 12:
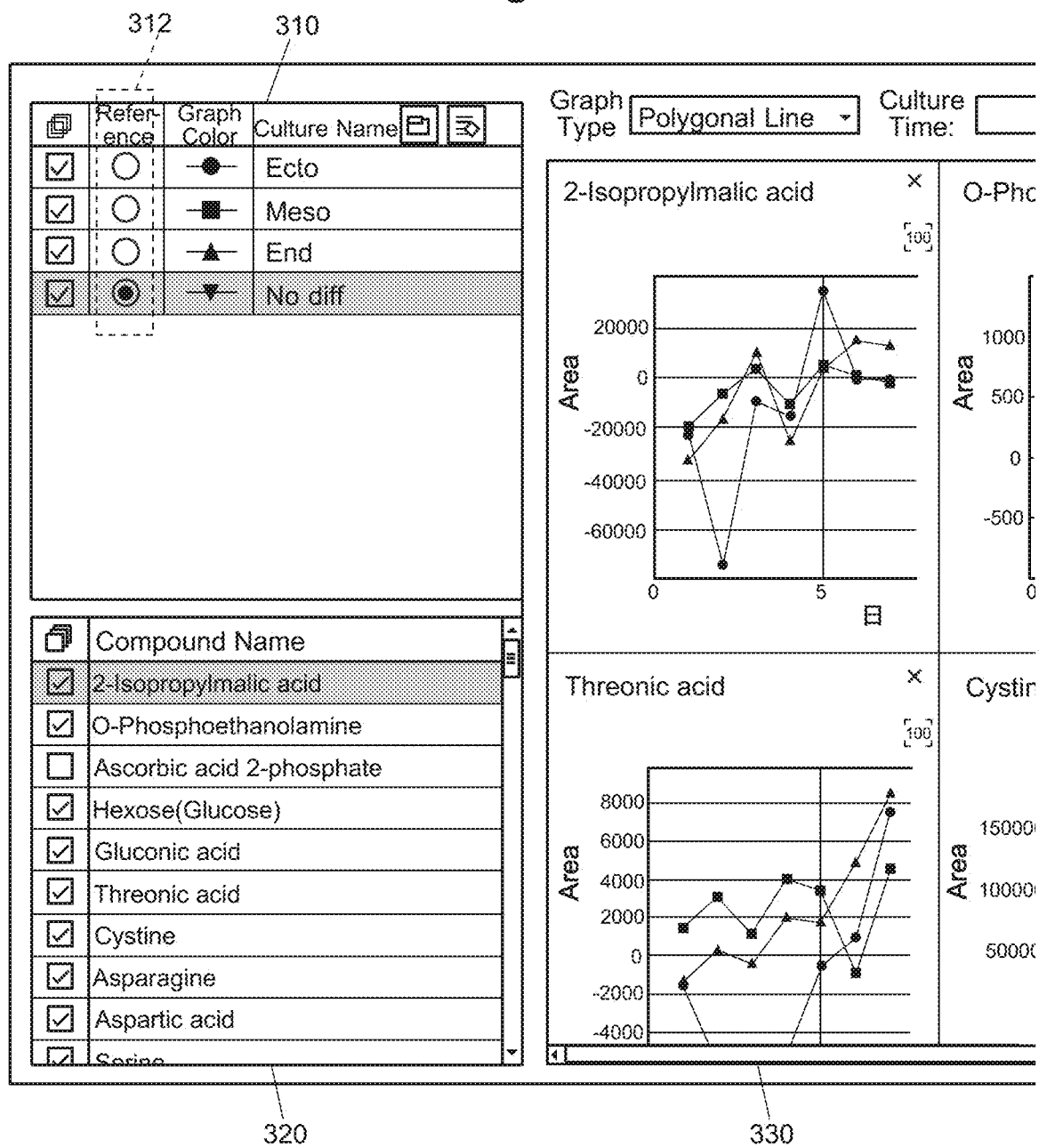
FIG. 12 is a left portion of the analysis result display window shown in FIG. 11.

It is also possible to select a reference sample from a plurality of culture-medium samples and display the difference between the analysis result for the reference sample and each of the analysis results obtained for the other culture-medium samples as follows: As shown in FIGS. 11 and 12, the operator checks a reference radio button 312 assigned to the row corresponding to one sample to be selected as the reference sample on the sample kind table displayed in the sample kind table display area 310. Then, the result display processor 44 calculates, for each compound, the difference between the peak area value or concentration value in the reference sample and the peak area value or concentration value in each of the other samples, as well as creates a trend graph showing the temporal change of that difference. The trend graphs are displayed in the graph display area 330.

In the example of FIGS. 11 and 12, the culture-medium sample with culture name "No diff" is selected as the reference sample, and trend graphs of the compounds, exclusive of ascorbic acid 2-phosphate, for the three other samples are shown on the graph display area 330. These trend graphs allow for more intuitive understanding of the change in the difference of the quantitative value from the reference value.

It should be noted that the previous embodiment is a mere example of the present invention, and any change, modification or addition appropriately made within the spirit of the present invention will naturally fall within the scope of claims of the present application.

For example, the number of vials that can be placed on the sample placement section 20 or 302 in the system according to the previous embodiment may be changed as needed. The shape of the rack on which the vials are placed in the sample placement section 20 or 302 can also be appropriately changed. The method of giving vial numbers may also be appropriately changed.

The previous embodiment is concerned with a system configured to analyze metabolites or similar compounds in culture-medium samples by an LC-MS. The system may be configured to analyze other compounds in culture-medium samples. The analyzing device is not limited to an LC-MS; it may be a GC-MS, or other types of analyzing devices, such as an optical analyzing device. As noted earlier, the pretreatment by the pretreatment device is not limited to the removal of proteins or other kinds of unwanted components; there are various possible pretreatments. The dilution of the sample may be performed in the pretreatment device, as opposed to the system according to the previous embodiment in which the dilution is performed in the autosampler.

REFERENCE SIGNS LIST

1 . . . Culture Device
2 . . . Pretreatment Device
20 . . . Sample Placement Section
21 . . . Pretreatment Executor
22 . . . Sample Transfer Section
3 . . . LC-MS
30 . . . Autosampler
301 . . . Sample Dilutor
302 . . . Sample Placement Section
303 . . . Sample Collector
31 . . . LC Unit
32 . . . MS Unit
4 . . . Data Processing Unit
40 . . . Sample Information Storage Section
41 . . . Data Storage Section
42 . . . Quantitative Analyzer
43 . . . Analysis Result Storage Section
44 . . . Result Display Processor
5 . . . Control Unit
50 . . . Pretreatment Execution Controller
51 . . . LC-MS Execution Controller
52 . . . Display Controller
53 . . . Input Processor
54 . . . Setting Information Storage Section
6 . . . Main Control Unit
7 . . . Operation Unit
8 . . . Display Unit
100 . . . Device Status Check Window
110 . . . Pretreatment Status Display Area
111 . . . First Sample Arrangement Image
112 . . . Arc-Shaped Area 113, 122 . . . Circular Area
120 . . . Analysis Status Display Area
121 . . . Second Sample Arrangement Image
114, 123 . . . Operation Status Display Section
130 . . . Start Button
131 . . . Pause Button
132 . . . Stop Button

The invention claimed is:

1. A biological sample analyzing system configured to analyze a sample originating from a biological tissue or microorganism culture medium, comprising:
   a) an analyzing device configured to perform a predetermined analysis on a sample and acquire signal-intensity-value data reflecting contents or concentrations of a plurality of compounds contained in the sample;
   b) a quantitative analyzer configured to calculate a quantitative value for each compound based on the signal-intensity-value data acquired with the analyzing device;
   c) an analysis result storage section configured to store, as an analysis result, the quantitative value of each compound calculated by the quantitative analyzer, along with sample information related to the analyzed sample or in association with the sample information;
   d) a table creator configured to use the sample information to retrieve, from the analysis result storage section, analysis results for a plurality of samples originating from a same biological tissue or microorganism culture medium and differing from each other in time of sampling, and to create a table in which quantitative values are arranged for each of the plurality of compounds as well as for each time of sampling;
   e) a graph creator configured to create a graph showing a temporal change of the quantitative values differing from each other in time of sampling for one or more compounds among the plurality of compounds; and
   f) a display processor configured to display, on a same screen of a display section, the table created by the table creator and the graph created by the graph creator.

2. The biological sample analyzing system according to claim 1, further comprising:
   an operation section configured to allow an operator to indicate a compound in the table displayed by the display processor,
   wherein:
   the display processor is configured to display, on the same screen on which the table is displayed, a graph showing a temporal change in the quantitative value for the compound indicated through the operation section.

3. The biological sample analyzing system according to claim 1, wherein:
   the table creator is configured to allow for a switching of numerical values arranged in the created table, from the quantitative values obtained for a plurality of samples at each time of sampling, to an average value of the quantitative values for the plurality of samples.

4. The biological sample analyzing system according to claim 1, wherein:
   the graph creator is configured to create a graph showing a temporal change in the average value of the quantitative values obtained for a plurality of samples for each time of sampling, in place of the graph showing a temporal change in quantitative value.

5. The biological sample analyzing system according to claim 1, wherein:
   the analyzing device includes a liquid chromatograph mass spectrometer or gas chromatograph mass spectrometer, and the quantitative analyzer is configured to create a chromatogram based on signal-intensity-value data acquired with the liquid chromatograph mass spectrometer or gas chromatograph mass spectrometer, and to determine, as a quantitative value, either an area value or height value of a peak corresponding to a compound on the chromatogram, or a concentration value determined from the area value or height value of the peak with reference to a calibration curve.

6. The biological sample analyzing system according to claim 1, wherein:
   the sample information includes a culture name, date and time of seeding, as well as the date and time of sampling.

7. The biological sample analyzing system according to claim 6, wherein:
   the graph creator is configured to calculate an average value of the quantitative values of a target compound in a plurality of samples which are given a same culture name and cultured under a same culture condition in culture containers that differ from each other in identification information, as well as a value representing an extent of a variation of the quantitative values, and to create, as the aforementioned graph, a graph in which the average value of the quantitative values is plotted, with an error bar representing the extent of the variation of the quantitative values.

8. The biological sample analyzing system according to claim 7, wherein:
   the value representing the extent of the variation of the quantitative values is a standard deviation of a plurality of quantitative values.

9. The biological sample analyzing system according to claim 6, wherein:
   the graph creator is configured to create a graph showing a temporal change in the quantitative value of a same compound obtained from a plurality of samples having different culture names, and to superpose the created graphs, with axes of the graphs coinciding with each other, to create one graph.

10. The biological sample analyzing system according to claim 6, wherein:
    the graph creator is configured to create, for each of quantitative values of a same compound obtained from a plurality of samples having different culture names, a graph showing a temporal change in a difference between the quantitative value concerned and a quantitative value obtained for a reference sample which is a sample having one of the culture names.

* * * * *